United States Patent Office 3,313,685
Patented Apr. 11, 1967

3,313,685
(TERT. ALKYLPHENOXY) ALKYL DIALKYLAMINES AND CONTROL OF CEREAL RUST
John J. D'Amico, Charleston, W. Va., assignor to Monsanto Company, St. Louis, Mo., a corporation of Delaware
No Drawing. Original application May 4, 1961, Ser. No. 107,634. Divided and this application Feb. 12, 1964, Ser. No. 351,577
8 Claims. (Cl. 167—30)

The present application is a division of application Ser. No. 107,613 filed May 4, 1961, now abandoned.

This invention relates to the control and eradication of cereal rusts and to (tert. alkylphenoxy)alkyl dialkylamines suitable for that purpose.

There is considerable demand for chemical adjuvants which will eradicate cereal rust after infestation is observed. Attacks are spasmodic and variable in frequency and severity so that continual preventive measures are not economically attractive. Unfortunately many otherwise effective fungicidal agents are innocuous to cereal rusts. This applies especially to phenoxyalkyl amines. However, there has now been discovered a small class of compounds extremely toxic to cereal rusts which eradicate the disease at concentrations low enough to be economically feasible and prevent renewed infestation. Application to infected plants in amounts as low as ¼ pound per acre destroys the causative organism.

The toxicants of this invention can be represented by the following formula:

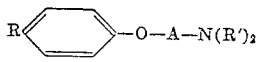

where R is tertiary alkyl of 6–8 carbon atoms, A is alkylene of 2 or 3 carbon atoms and R' is alkyl of 2 or 3 carbon atoms. They may be prepared by reacting the corresponding dialkylaminoalkyl halide with the appropriate tert. alkyl phenol. Quaternary salts are essentially equivalent and may be formed by the conventional method of quaternization with an alkyl halide.

The above-described (tert. alkylphenoxy)alkyl dialkylamines and their quaternary ammonium salts have other useful properties. The quaternary salts and to a lesser extent the free bases are toxic to bacteria.

The invention is further illustrated, but not limited, by the following examples:

EXAMPLE 1

To a stirred slurry of 41.4 grams (0.2 mole) of technical octylphenol containing about 85–90% of p-1,1,3,3-tetramethylbutyl phenol, 300 ml. of acetone, 25.2 grams (0.4 mole) of 90% potassium hydroxide and 20 ml. of water was added in one portion 34.4 grams (0.2 mole) of β-chlorotriethylamine hydrochloride. The mixture was then heated at 50–56° C. for 6 hours, cooled to 25° C. and 400 ml. of water and 400 ml. of ethyl ether added. After stirring for 15 minutes, the ether layer was washed with water until neutral to litmus, dried over sodium sulfate and the ether removed in vacuo at a maximum temperature of 80–90° C./1–2 mm. 2-[p-(1,1,3,3 - tetramethylbutyl)phenoxy]triethylamine was obtained in 94.9% yield as an amber oil. Analysis gave 4.4% nitrogen compared to 4.6% calculated for $C_{20}H_{35}NO$. It is insoluble in water but soluble in common organic solvents.

EXAMPLE 2

To a solution of 30.6 grams (0.1 mole) of the product of Example 1 in 100 ml. of acetone was added in one portion 28.4 grams (0.2 mole) of methyl iodide. This caused the temperature of the reaction mixture to rise from 25 to 40° C. The product was stirred at 25–30° C. for 24 hours, cooled to 0° C. and the precipitate collected by filtration. After air drying at 25–30° C., 32 grams of product were obtained melting at 133–135° C. Acetone was removed from the filtrate in vacuo and an additional 10 grams of material was obtained melting at 133–135° C. after recrystallization from ethyl alcohol. The total yield of N-methyl 2-[p-(1,1,3,3-tetramethylbutyl)phenoxy]triethylammonium iodide was 94% of a white solid. Analysis gave 3.0% nitrogen compared to 3.1% calculated for $C_{21}H_{38}INO$. It was soluble in acetone, ethanol, hot water and hot benzene but insoluble in ether and heptane. This compound inhibited growth of Staphylococcus aureus at 1 to 100,000 dilution.

EXAMPLE 3

Butyl iodide was substituted for methyl iodide in Example 2. The stirred solution was heated at 55–56° C. for 24 hours and the acetone removed in vacuo at a maximum temperature of 30° C./1–2 mm. To the resulting semi-solid was added 50 ml. of ethyl ether and the mixture stirred for 5 minutes. The precipitate was collected by filtration and air dried on a porous plate. N - butyl 2 - [p - (1,1,3,3 - tetramethylbutyl)phenoxy] triethylammonium iodide was obtained in 37% yield as a tan solid melting at 87–91° C. Analysis gave 2.9% nitrogen, the value calculated for $C_{24}H_{44}INO$. Complete inhibition of the bacteria Staphylococcus aureus at a dilution of 1 to 1,000,000 was obtained employing the product of this example.

EXAMPLE 4

To a stirred solution of 41.4 grams (0.2 mole) of p-1,1,3,3-tetramethylbutyl phenol as described in Example 1, 300 ml. of acetone, 25.2 grams (0.4 mole) of 90% potassium hydroxide and 10 ml. of water, was added in one portion 37.2 grams (0.2 mole) of N,N-diethyl γ-chloropropylamine hydrochloride and the mixture heated at 50–56° C. for 18 hours. After cooling to 25° C., 300 ml. of water and 300 ml. of ethyl ether were added and the mixture stirred for 15 minutes. The ether layer was washed with water until neutral to litmus and dried over sodium sulfate. The ether was removed in vacuo at a maximum temperature of 80–90° C./1–2 mm. N-[p-(1,1,3,3-tetramethylbutyl)phenoxytrimethylene]diethylamine was obtained in 91% yield as an amber oil. Analysis gave 4.3% nitrogen compared to 4.4% calculated for $C_{21}H_{37}NO$. It was insoluble in water but soluble in common organic solvents.

EXAMPLE 5

To a stirred solution of 17.8 grams (0.1 mole) of p-1,1-dimethylbutyl phenol, 200 ml. of acetone, 12.6 grams (0.2 mole) of 90% potassium hydroxide and 10 ml. of water was added in one portion of 17.2 grams (0.1 mole) of β-chlorotriethylamine hydrochloride and the mixture heated at 50–56° C. for 18 hours. After cooling to 25° C., 300 ml. of water and 300 ml. of ethyl ether were added. The product was stirred for 15 minutes, the ether layer washed with water until neutral to litmus and dried over sodium sulfate. The latter was removed in vacuo at a maximum temperature of 80–90° C./1–2 mm. 2-[p-(1,1-dimethylbutyl)phenoxy]triethylamine was obtained in 93.9% yield as an amber oil. Analysis gave 5.1% nitrogen compared to 5.0% calculated for $C_{18}H_{31}NO$. It is insoluble in water but soluble in common organic solvents.

EXAMPLE 6

N,N-diethyl γ-chloropropylamine hydrochloride was substituted for β-chlorotriethylamine hydrochloride in the procedure of Example 5. N-[p-(1,1-dimethylbutyl)phenoxyethylene]-dipropylamine was obtained as an amber oil in 88% yield. Analysis gave 4.1% nitrogen compared to 4.6% calculated for $C_{20}H_{35}NO$. It is insoluble in water but soluble in common organic solvents.

Typical of the effectiveness of the products of the present invention as cereal rust eradicants is their destructive action against the organism *Puccinia recondita*. A supply of this fungus, representing several different races, was maintained on unsprayed living plants because it is an obligate parasite and its physiology may be altered by chemicals. Sprays containing the fungicide at concentrations between 300 to 3000 parts per million, that is from 0.03% to 0.3%, of the (tert. alkylphenoxy)alkyl dialkylamine have been found satisfactory for eradicating the causative agent of cereal rust.

Demonstration of effectiveness as cereal rust eradicants follows:

EXAMPLE 7

The foliage of ten 7-day-old wheat plants of the Seneca variety were subjected to a fine mist of water in a moist chamber for two hours to assure free water on the plant surface. Wheat plants infected with the leaf rust organism described were then brushed over the wet foliage to disperse the spores. The plants were then incubated in an incubation chamber with 100% relative humidity at a temperature of 65–70° F. for 12 hours and subsequently transferred to a greenhouse with a temperature of 78–80° F.

Four days after inoculation and when flecking was observed the plants were sprayed with a solution of the 2-[p-(1,1,3,3-tetramethylbutyl)phenoxy]triethylamine of Example 1. A stock solution was prepared by dissolving 300 ml. of the chemical in 30 ml. of acetone to make up a 1% solution. Three drops of an emulsifying agent known to the trade as "Tween 20" and reputed to be a polyoxyethylene sorbitan monolaurate were added. 0.3 ml. of this stock solution was then brought up to 10 ml. volume with addition of water. This corresponded to 300 p.p.m. concentration of the test material. Observation of the plants 12 days after inoculation disclosed that the plants which had been sprayed with the test chemical were entirely free of rust pustules. By contrast, N-[p-(1, 1, 3, 3 - tetramethylbutyl)phenoxyethyl]dimethylamine applied as in the above example gave no control of wheat rust. Plants treated with it in the form of a suspension containing 3,000 p.p.m. of the test chemical were no better than similarly inoculated but unsprayed plants which had been maintained in the incubator and greenhouse for the same length of time. The control plants as well as plants treated with N-[p-(1,1,3,3-tetramethylbutyl)phenoxyethyl]dimethylamine were found to be badly infected with rust.

EXAMPLE 8

In this example, the N-[p-(1,1,3,3-tetramethylbutyl)-phenoxytrimethylene]diethylamine of Example 4 was tested for its wheat rust eradicating activity. Using the testing procedure described in Example 7, complete eradication of the rust was observed with plants which had been sprayed with a 0.03% solution of the product of Example 4.

EXAMPLE 9

An aqueous suspension of N-methyl 2-[p-(1,1,3,3-tetramethylbutyl)phenoxy]triethylammonium iodide of Example 2 was prepared containing 0.03% by weight of the salt. Since this salt is a wettable powder, the addition of the emulsifier of the above examples was omitted in making this emulsion. The suspension was applied to the wheat plants as described in the above examples. No rust pustules were observed on the plants treated with the suspension.

EXAMPLE 10

N-butyl 2-[p-(1,1,3,3-tetramethylbutyl)phenoxy]triethylammonium iodide of Example 3 was tested against rust by the procedure of Example 7. In this case again, the compound was a wettable powder and was applied as an aqueous suspension of the salt, at a concentration of 0.03% by weight, to infected plants. Almost complete eradication of rust was observed with plants which had been sprayed with this salt.

EXAMPLE 11

2-[p-(1,1-dimethylbutyl)phenoxy]triethylamine of Example 5 was tested against rust by the procedure of Example 7. Almost complete eradication of rust was observed with plants which had been sprayed with a 0.03% solution of this compound. By contrast, plants treated with a suspension containing 3,000 p.p.m. of 2-[p-(1,1-dimethylpropyl)phenoxy]triethylamine were badly infected with rust and were no better than the control plants.

EXAMPLE 12

In this example the N-[p-(1,1-dimethylbutyl)phenoxyethylene]dipropylamine of Example 6 was tested for its wheat rust eradicating activity. Using the testing procedure described in Example 7, eradication of the rust was observed with plants which had been sprayed with a 0.03% solution of the product of Example 6 to nearly the same degree as in Example 11. However, in general compounds of the described class in which R' was ethyl are considerably more effective than where R' was propyl or isopropyl. Also R is preferably tertiary octyl.

In general, the toxicants are applied at dosages within the range of ¼–3 pounds per acre in an amount sufficient to provide effective rust eradication without substantial phytotoxic damage to the plants. At dosages above about 2 pounds per acre phytotoxicity may be noticeable and usually is substantial above about 3 pounds per acre. The toxicants may be used in conjunction with other rust eradicants and preventives as for example sulfur and compounds of nickel. Application of admixtures with the nickel compounds described by Keil et al. in U.S. Patent 2,971,880, granted Feb. 14, 1961, is advantageous to prolong residual activity.

It is intended to cover all changes and modifications of the examples of the invention herein chosen for purposes of disclosure which do not constitute departures from the spirit and scope of the invention.

What is claimed is:

1. The method of treating plants to control rust pathogens which comprises treating rust infested living plants with a composition in amount sufficient to provide effective rust eradication without substantial phytotoxic damage containing as an essential active ingredient a compound selected from the class consisting of amines of the formula

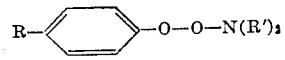

where R is tertiary alkyl of 6 to 8 carbon atoms inclusive, A is alkylene of 2 to 3 carbon atoms inclusive and R' is alkyl of 2 to 3 carbon atoms inclusive and quaternary ammonium salts thereof.

2. The method of treating plants to control rust pathogens which comprises treating rust infested living plants with a composition in amount sufficient to provide effective rust eradiation without substantial phytotoxic damage containing as an essential active ingredient a compound of the formula

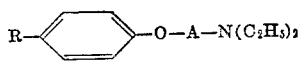

where R is tertiary alkyl of 6 to 8 carbon atoms inclusive and A is alkylene of 2 to 3 carbon atoms inclusive.

3. The method of treating plants to control rust pathogens which comprises treating rust infested living plants with a composition in amount sufficient to provide effective rust eradication without substantial phytotoxic damage containing as an essential active ingredient 2-[p-(1,1,3,3-tetramethylbutyl)-phenoxy]triethylamine.

4. The method of treating plants to control rust pathogens which comprises treating rust infested living plants with a compositon in amount sufficient to provide effective rust eradication without substantial phytotoxic damage containing as an essential active ingredient N-methyl 2 - [p - (1,1,3,3 - tetrabutyl)phenoxy]triethylammonium iodide.

5. The method of treatng plants to control rust pathogens which comprises treating rust infested living plants with a composition in amount sufficient to provide effective rust eradication without substantial phytotoxic damage containing as an essential active ingredient N-butyl 2 - [p - (1,1,3,3 - tetramethylbutyl)phenoxy]triethylammonium iodide.

6. The method of treating plants to control rust pathogens which comprises treating rust infested living plants with a composition in amount sufficient to provide effective rust eradication without substantial phytotoxic damage containing as an essential active ingredient N-[p - (1,1,3,3 - tetramethylbutyl)phenoxytrimethylene]diethylamine.

7. The method of treating plants to control rust pathogens which comprises treating rust infested living plants with a composition in amount sufficient to provide effective rust eradication without substantial phytotoxic damage containing as an essential active ingredient 2-[p-(1,1-dimethylbutyl)phenoxy]triethylamine.

8. The method of treating plants to control rust pathogens which comprises treating rust infested living plants with a composition in amount sufficient to provide effective rust eradication without substantial phytotoxic damage containing as an essential active ingredient N-[p-(1,1-dimethylbutyl)phenoxyethylene]dipropylamine.

References Cited by the Examiner

UNITED STATES PATENTS 3,032,406    5/1962    D'Amico et al. _____ 71—2.3

OTHER REFERENCES

Chem. Abstracts 48: #1484a (1954).
Chem. Abstracts 49: #5752a (1955).
Chem. Abstracts 53: #8513i–#8514b (1959).
Biological Abstracts 32: #35133; #35450 (1958).
Biological Abstracts 33: #3570 (1959).
Erekaev, V. P.: "Method of obtaining quaternary ammonium compounds from new types of raw materials," Meditsinskaya Promyshlennost S.S.S.R. 13(10): 20–26 (1959); abstracted in English in Chem. Abstracts 54(12): 12484i–12485e, June 25, 1960.

ELBERT L. ROBERTS, *Primary Examiner.*

S. K. ROSE, *Assistant Examiner.*